(12) United States Patent
Koshiba et al.

(10) Patent No.: US 7,231,093 B2
(45) Date of Patent: Jun. 12, 2007

(54) IMAGE CODE ESTIMATION

(75) Inventors: Osamu Koshiba, Ibaraki (JP); Akira Osamoto, Ibaraki (JP); Satoru Yamauchi, Ibaraki (JP)

(73) Assignee: Texas Instuments Incorporated, Dallas, TX (US)

( * ) Notice: Subject to any disclaimer, the term of this patent is extended or adjusted under 35 U.S.C. 154(b) by 706 days.

(21) Appl. No.: 10/633,158

(22) Filed: Aug. 1, 2003

(65) Prior Publication Data
US 2005/0025370 A1 Feb. 3, 2005

(51) Int. Cl.
G06K 9/46 (2006.01)
(52) U.S. Cl. .................................... 382/246
(58) Field of Classification Search .............. 382/232, 382/237, 244, 245, 246, 251
See application file for complete search history.

(56) References Cited
U.S. PATENT DOCUMENTS
5,901,250 A * 5/1999 Ohara ...................... 382/246

6,614,938 B2 * 9/2003 Yamaguchi et al. ......... 382/239
6,658,157 B1 * 12/2003 Satoh et al. ................ 382/239
6,711,295 B2 * 3/2004 Nakayama et al. ......... 382/232
6,909,811 B1 * 6/2005 Kajiwara et al. ........... 382/246

* cited by examiner

Primary Examiner—Matthew C. Bella
Assistant Examiner—Brian Le
(74) Attorney, Agent, or Firm—Carlton H. Hoel; W. James Brady; Frederick J. Telecky, Jr.

(57) ABSTRACT

Estimation of the code size of variable length encoding of quantized DCT coefficients by summation over histogram bins of products of number of bin members and a code size of an average run of zero coefficients coupled with a representative level from the bin. The estimation provides low-complexity feedback for quantization level adjustment to obtain variable length code size target without actual performance of a quantization level plus variable length encoding.

7 Claims, 2 Drawing Sheets

IMAGE CODE ESTIMATION

CROSS-REFERENCE TO RELATED APPLICATIONS

The following applications disclose related subject matter: application. Ser. No. 10/917,980, filed Aug. 13, 2004 and Ser. No. 11/218,407, filed Sep. 1, 2005. These referenced applications have a common assignee with the present application.

BACKGROUND OF THE INVENTION

The present invention relates to digital image processing, and more particularly to compressive encoding of images.

In many applications of digital image processing, such as JPEG, MPEG or DV, image data is compressed by successive operations of DCT (Discrete Cosine Transform), quantization, and Huffman (variable length) encoding. DCT is a pre-processing operation for image compression which converts blocks of spatial domain information of the image into blocks of frequency domain information, typically for 8×8 blocks of pixels. Generally, the transformed image has a tendency to strong correlations within a neighborhood; DCT processing concentrates a majority of the information of the image into the low frequencies. Quantization is an effective compression method which divides the DCT coefficients by an integer quantization level so as to reduce the precision (number of significant bits) of the DCT coefficients. The quantized DCT coefficients of a block are scanned from low frequency to high frequency and converted into a sequence of pairs of 'run' and 'level' parameters (run length encoding). Using a Huffman code table defined by the statistics of an image, the sequence of run-level pairs are finally converted to a sequence of Huffman (variable length) codewords. The Huffman tables for differing sets of variables of JPEG, MPEG, or DV are fixed in the specifications of these standards.

In these image compression methods, the size of the Huffman code generated is strongly dependent on the quantization level. Therefore, it is necessary to apply a suitable quantization level to adjust an output code size to a target code size. One useful quantization level approach has a feedback loop comparing a target code size and a code size actually generated by the encoder circuit. This approach enables estimation and response to a current code size accurately because actual output code size is used as a comparison to the target code size. However, there is a delay corresponding to the speed of the encoding algorithm to output the actual code. As a result, there is a delay for convergence to the target code size.

SUMMARY OF THE INVENTION

The present invention provides estimation of the code size for digital image compression by simplifying the feedback flow for the quantization process for DCT coefficients and Huffman encoding.

This has advantages including more efficient quantization without time delay of actual code generation.

BRIEF DESCRIPTION OF THE DRAWINGS

The drawings are heuristic for clarity.

DESCRIPTION OF THE PREFERRED EMBODIMENTS

1. Overview

Figure 1A:
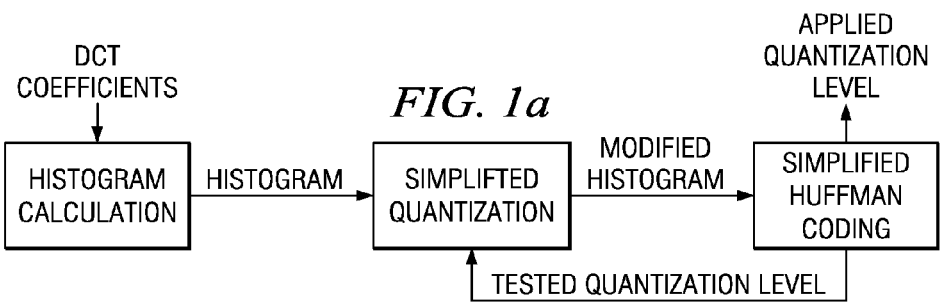
FIGS. 1a-1b show functional block diagrams of preferred embodiment method and preferred embodiment system.

Preferred embodiment image processing methods include low complexity estimates of the code size for Huffman (variable length code) encoding a block of quantized DCT coefficients; this provides quantization level feedback information for selection of a quantization level(s). The method uses a histogram of the non-zero DCT coefficient magnitudes of (an area of) a block together with normalized code-size functions (a function for representative "level"s and depending upon an average "run") from the Huffman table. The average "run" in the code is estimated from the number of zero and non-zero quantized coefficients in (the area of) the block. FIG. 1a is a functional block diagram for a preferred embodiment method.

Figure 1B:
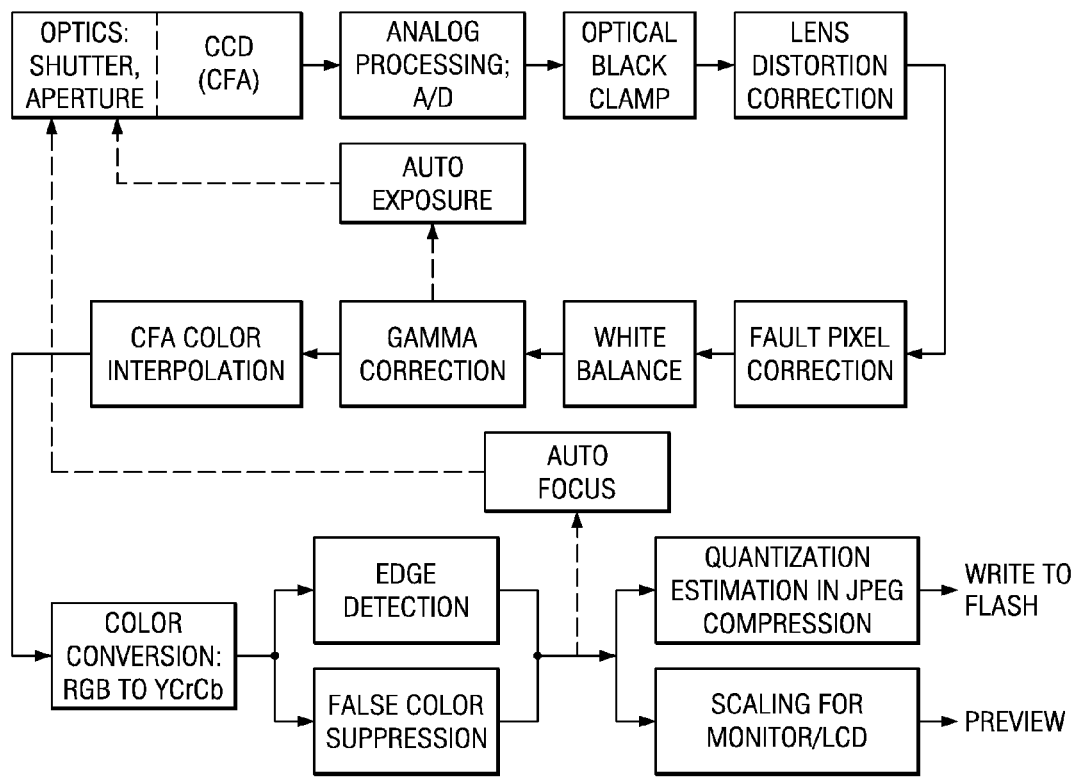

Preferred embodiment digital image systems (such as cameras) include preferred embodiment image processing methods. FIG. 1b shows in functional block form a system (digital still camera) which incorporates preferred embodiment methods as illustrated in the JPEG compression block. The functions of preferred embodiment systems can be performed with digital signal processors (DSPs) or general purpose programmable processors or application specific circuitry or systems on a chip such as both a DSP and RISC processor on the same chip with the RISC processor as controller. Further specialized accelerators, such as CFA color interpolation and JPEG encoding, could be added to a chip with a DSP and a RISC processor. Captured images could be stored in memory either prior to or after image pipeline processing. The image pipeline functions could be a stored program in an onboard or external ROM, flash EEPROM, or ferroelectric RAM for any programmable processors.

2. First Preferred Embodiment

FIG. 1a is a functional block diagram of a first preferred embodiment method of quantization level determination and which includes the following steps. First prepare a histogram of the magnitudes of the DCT coefficients of a (8×8) block; this enables easy estimation of the histogram resulting from a quantization process and reveals the magnitude tendencies which impact the actually generated code size. For a fixed-point processor, a definition of the histogram bins as the ranges $2^n \sim 2^{n+1}-1$ (n=0, 1, 2, ...) is especially desirable for the simplicity of implementation. Note that 0 coefficients do not appear in the histogram. Also, quantization amounts to integer division by the quantization level, so quantization levels as powers of 2 permit binary shifting for the division.

Figure 2:
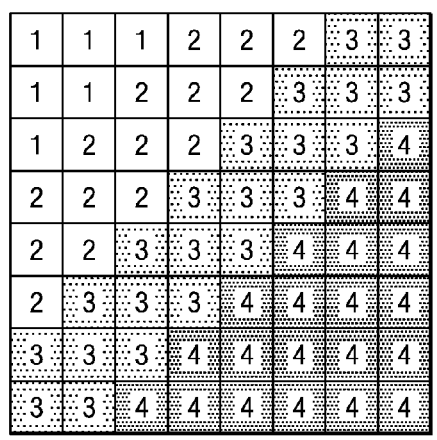
FIG. 2 illustrates partitioning a block.

Many of the specifications in standards such as JPEG, MPEG, take the DCT coefficient quantization level to depend upon the DCT frequency; that is, a non-flat quantization matrix. Such frequency-dependent quantization levels use the fact that the sensitivity of the human visual system to high spatial frequency components in an image is less than that to low spatial frequency components. In this case, partitioning the DCT coefficient block into several areas which correspond to spatial frequency ranges increases the accuracy of the estimation of generated code size. FIG. 2 shows an example of this partitioning into four areas and is applicable to the DV standard encoding process. Note the zig-zag scan order of the DCT coefficients aligns to this partitioning so that the areas are sequentially scanned. Thus, if each DCT block is partitioned into j areas and the magnitudes of the DCT coefficients can be represented by N bits and the histogram bins are taken to be the ranges $2^n \sim 2^{n+1}-1$ (n=0, 1, 2, ..., N-1), define the following histogram variable:

H(i,j): the number of coefficients in bin $2^i \sim 2^{i+1}-1$ (i=0, 1, 2 ..., N-1) in area j The preferred embodiment methods use such a histogram with bins of the ranges $2^n \sim 2^{n+1}-1$ for a fast approximation of the quantization process. In particular, for the case of the quantization levels defined in a specification under consideration confined to $2^M$ (M=0, 1, 2 ...), the quantization level changes are achieved by shifting values of each bin of the histogram. That is, with quantization level $2^M$ the number of quantized coefficients, Hq(i,j), within the bin $2^i \sim 2^{i+1}-1$ (i=0,1,2 ..., N-1) in area j is given by:

$$Hq(i, j) = \begin{cases} H(i+M, j) & (0 \le i \le N - M - 1) \\ 0 & \text{(others)} \end{cases}$$

Even if the quantization levels defined in the specification under consideration are arbitrary integers, the histogram after the quantization Hq(i,j) can be represented approximately by scaling a graph of the distribution given by the original histogram H(i,j).

The variable-length code size of the block after quantization is estimated from the given Hq(i,j) by simplifying the Huffman table. Inputs for the Huffman table are the parameters "run" and "level", so consider an expressions for these parameters using Hq(i,j). Note that the sign of a coefficient typically is the last bit of the codeword, so coefficient differing by sign have the same magnitude and same codeword size. The parameter "run" is the number of zero coefficients between significant coefficients when scanning the DCT block from the low frequency (upper lefthand portion in FIG. 2) to the high frequency (lower righthand portion), the so-called zig-zag scanning. If the total number of coefficients in area j is denoted A(j), the parameter "run" in area j can be estimated as the number of 0 coefficients divided by the number of non-zero coefficients. Now the number of non-zero coefficients in area j equals $$\sum_i Hq(i, j),$$

so estimate "run" by r'(j) as follows.

$$r'(j) \equiv \frac{A(j) - \sum_i Hq(i, j)}{\sum_i Hq(i, j)}$$

As to the parameter "level", it already is implicit in the histogram bins for the magnitudes of the DCT coefficients in area j. Therefore, if an average value is utilized as a representative for the bin of the range $2^i \sim 2^{i+1}-1$, the parameter "level" can be estimated for coefficients in the bin by l'(i):

$$l'(i) \equiv \frac{2^{i+1} - 1 + 2^i}{2}$$

This can also be simplified to the maximum value $2^{i+1}-1$ in the case that the specification under consideration has a restrictive upper limit on the generated code size. That is, $$l'(i) = 2^{i+1} - 1$$

In any case, the representative value l'(i) is not dependent on the area j. Now, r'(j) and l'(i) provide input parameters for the Huffman table. If the code size of the entry "run"=r and "level" =l in the Huffman table under consideration is denoted as T(r,l), then the code size c(j) for the coefficients in area j of the DCT block can be estimated as follows.

$$c(j) = \sum_{i=0}^{N-1} Hq(i, j) T(r'(j), l'(i))$$

In this equation, T(r, l) is only applied to the representative value, l'(i), for each bin i. Therefore, for this estimation, an original Huffman table can be reduced to the table restricted to the representative "level"s. However, this calculation contains an undesirable division operation from the definition of r'(j). The division can be avoided by using a normalized function T'(x,i) for each bin i where x is a normalized variable of the number of non-zero coefficients applicable to all areas. As shown in the expression for r'(j), it is determined by the fixed number of coefficients in area j, A(j), and the variable number of non-zero coefficients in area j, ΣHq(i,j). By normalizing (scaling) the number A(j) to a convenient integer A(=α(j)A(j) and the number ΣHq(i,j) to ΣHq(i)(=α(j)ΣHq(i, j)), a function of the Huffman table T(r'(i), l'(i)) can be re-defined independent of area j. Thus, code size c(j) can be represented as follows:

$$c(j) = \sum_{i=0}^{N-1} Hq(i, j) T'(x, i)$$

$$x = \alpha(j) \sum_j Hq(i, j) \quad \left(\alpha(j) = \frac{A}{A(j)}\right)$$

Figure 3:
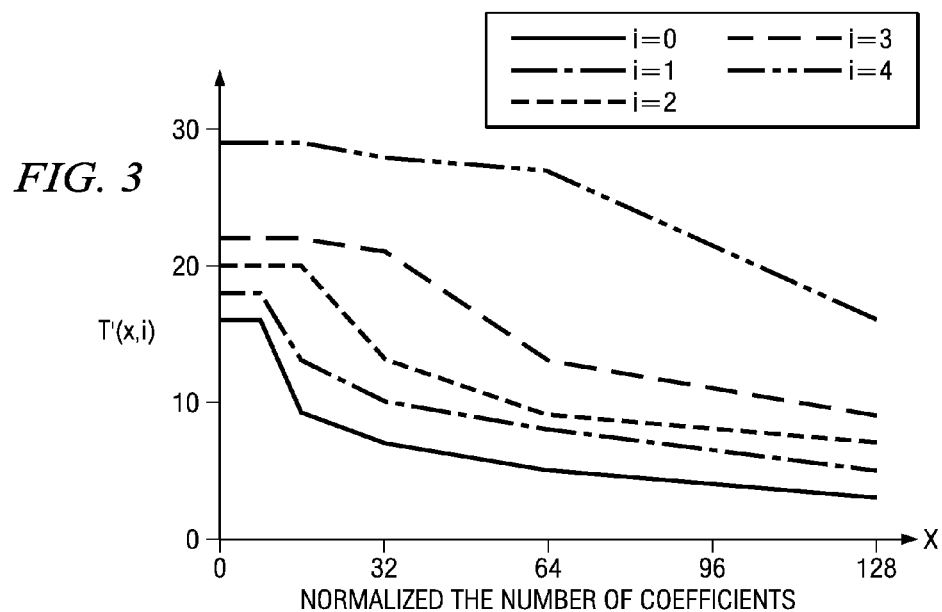
FIG. 3 shows an approximation function.

That is, x is the number of non-zero coefficients in A(j) normalized to a total of A coefficients; hence, the average "run" in A(j) is r'(j)=(A-x)/x and so the definition T'(x,i)=T ((A-x)/x,l'(i)) essentially precomputes the division in r'(j). FIG. 3 shows an example of expressions for T'(x,i) for i=0, 1, ..., 7 which are applicable to the Huffman table in the DV specification. In FIG. 3, the number of coefficients is normalized to A=128. It is necessary to define T'(x,i) only for i=0, 1, 2, 3, 4 because the defined table for "level" over 32 has the corresponding size of the Huffman code depending only on "run".

As a result, a total code size, S, for the DCT block can be approximated as $$S = \sum_j c(j)$$

Thus, a total code size for each block of DCT coefficients can be calculated by the summation of the code sizes of the coefficients in the areas in the DCT block which, in turn, is estimated by the histogram for each area by simplified operation for the quantization level and the Huffman coding (T'(x,i)) without performing an actual encoding.

As illustrated in FIG. 1a, the code size estimation for a tentative quantization level is then used to select a quantization level for subsequent variable-length encoding.

3. Experimental Results

Figure 4:
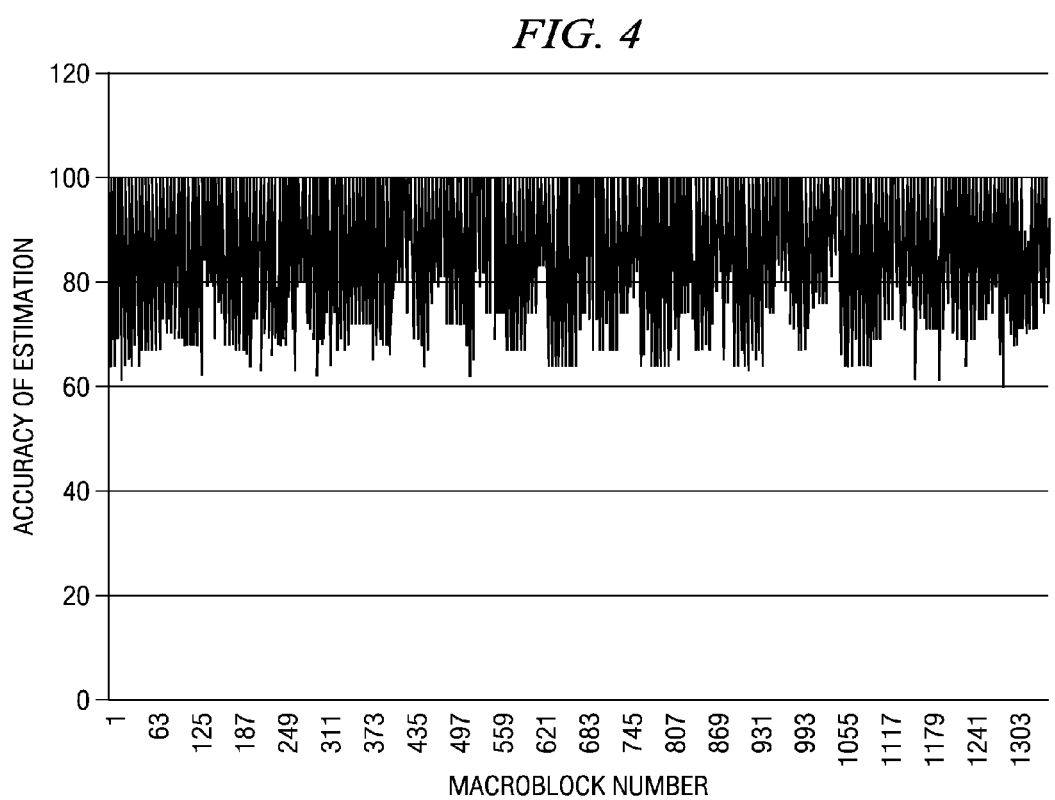
FIG. 4 depicts experimental results.

FIG. 4 shows an result of the preferred embodiment code size estimation method applied to the DV image encoding process using the 8×8 block partitioning shown in FIG. 2 and with the normalized code size approximations shown in FIG. 3. Most of the estimation (code sizes estimated for 1350 macroblocks) has an accuracy ranged from 60% to 100%. On average, the accuracy of this estimation method is 87%.

4. Modifications

The preferred embodiment code size estimation methods can be varied in various ways while preserving the feature of estimating the code size from a histogram of coefficient magnitudes together with the normalized code size functions from the Huffman (variable length code) table.

For example, the DCT coefficient block size could be increased (e.g., 16×16) or decreased, the number of areas in a block could be varied from 1 to any convenient number, normalization size A for the normalized code size functions T'(x,i) can all be varied, and so forth. The same code size estimation as a function of quantization level could be applied to coefficients of a wavelet transform in place of the DCT.

What is claimed is:

1. A method of estimating the size of variable-length code, comprising:
   (a) providing a block of quantized coefficients;
   (b) forming a histogram of magnitudes of non-zero ones of said quantized coefficients;
   (c) estimating a code size for said block of quantized coefficients as a sum of one or more terms where each of said terms is a product of (i) the number of said quantized coefficients in a bin of said histogram and (ii) a code size of a variable length code for an average run of zero-valued ones of said quantized coefficients together with a representative level for said bin.

2. The method of claim 1, wherein:
   (a) said code size of (ii) of step (c) of claim 1 is a normalized code size estimate depending upon a normalized number of non-zero coefficients in said bin.

3. The method of claim 1, further comprising:
   (a) providing a second block of quantized coefficients;
   (b) forming a second histogram of magnitudes of said second block; and
   (c) estimating a second code size for said second block.

4. The method of claim 1, further comprising:
   (a) adjusting the quantization level used to quantize a block of coefficients to generate said block of quantized coefficients; and
   (b) estimating a code size for said block of coefficients after quantizing using said adjusted quantization level.

5. The method of claim 1, wherein:
   (a) said average run of zero-valued ones of said quantized coefficients of (ii) of step (c) of claim 1 is computed from a scaling of said histogram.

6. The method of claim 1, wherein:
   (a) said code size of (ii) of step (c) of claim 1 is from a restricted variable-length code table.

7. A method of encoding, comprising:
   (a) estimating a code size which would arise from using a table of run and level variable length codewords to encode a block of coefficients which have been quantized with a first set of quantization levels;
   (b) quantizing said block of coefficients using the results of step (a) as part of a selection of a set of quantization levels for said block of coefficients; and
   (c) encoding said block of quantized coefficients using said table;
   (d) wherein said estimating of step (a) includes:
      (i) forming a histogram of said block of coefficients when quantized with said first set of quantization levels;
      (ii) estimating a code size for said block of quantized coefficients of (i) as a sum of terms where each of said terms is a product of (i) the number of said quantized coefficients in a bin of said histogram and (ii) a code size of a variable length code from said table for an average run of zero-valued ones of said quantized coefficients together with a representative level for said bin.

* * * * *